J. M. COLEMAN AND K. F. NYSTROM.
CAR TRUCK.
APPLICATION FILED MAY 31, 1917.

1,321,889.

Patented Nov. 18, 1919.
3 SHEETS—SHEET 1.

Inventors
James M. Coleman
Karl F. Nystrom
By Fetherstonhaugh & Co
Attys.

J. M. COLEMAN AND K. F. NYSTROM.
CAR TRUCK.
APPLICATION FILED MAY 31, 1917.

1,321,889.

Patented Nov. 18, 1919.
3 SHEETS—SHEET 2.

Inventors
James M. Coleman
Karl F. Nystrom
By Fetherstonhaugh & Co
Attys.

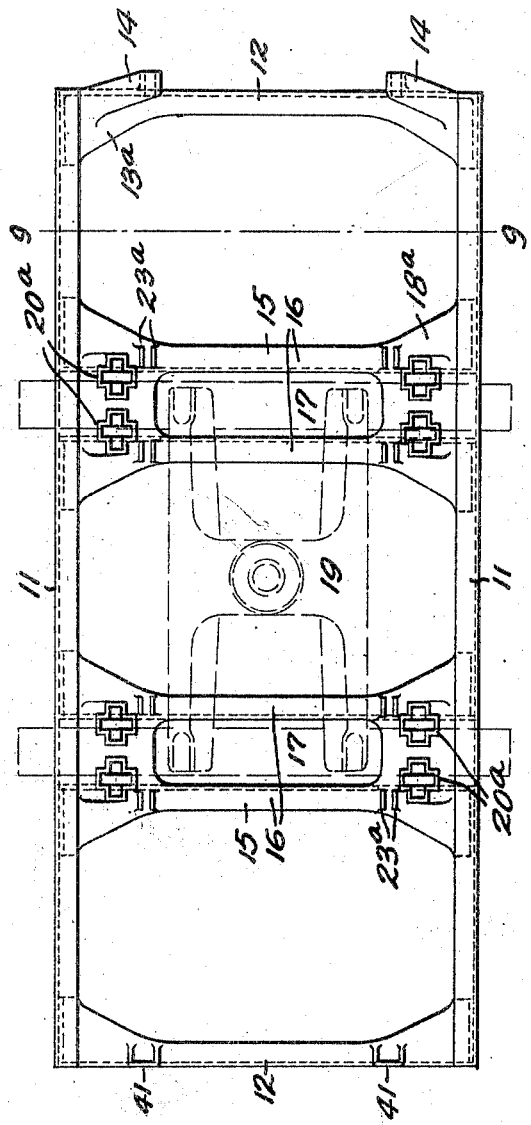
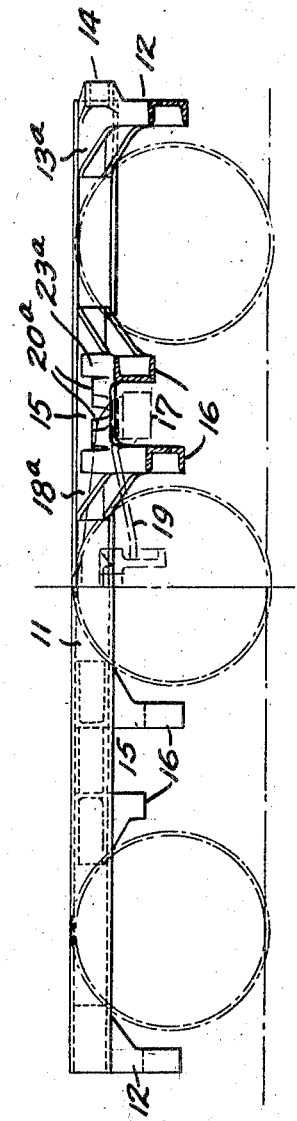

UNITED STATES PATENT OFFICE.

JAMES M. COLEMAN AND KARL F. NYSTROM, OF MONTREAL, QUEBEC, CANADA.

CAR-TRUCK.

1,321,889.  Specification of Letters Patent.  Patented Nov. 18, 1919.

Application filed May 31, 1917. Serial No. 172,130.

*To all whom it may concern:*

Be it known that we, JAMES M. COLEMAN, a citizen of the United States of America, and KARL F. NYSTROM, a subject of the King of Sweden, and both residents of the city of Montreal, in the Province of Quebec and Dominion of Canada, have invented certain new and useful Improvements in Car-Trucks, of which the following is a full, clear, and exact description.

This invention relates to improvements in car trucks, and the object of the invention may be stated broadly as threefold; namely, to provide a car truck particularly adapted for the clasp brake now coming into use; secondly, to provide a clasp brake gear coöperating with the truck; and thirdly, to provide a device which may be quickly, easily and economically constructed, and which will have a large measure of durability and efficiency.

Among the subsidiary objects of the invention are the employment of a minimum number of parts, the standardization of parts, and convenient disposition of parts permitting easy replacements. The latter of these objects refers more particularly to the brake gear, while the former refer both to the truck construction and brake gear.

Broadly speaking, the invention consists in providing a truck frame built up of a minimum number of parts, and having attaching and guiding lugs for the brake gear placed thereon at suitable points. The truck frame may be composed of structural or rolled steel members riveted together, or of a series of castings riveted together, while the brake gear consists of a series of beams, hangers, release springs, operating levers and links, which are as far as possible uniform throughout the truck, so that interchange of parts and renewals may be easily effected.

In the drawings which illustrate the invention:—

Fig. 7 is a plan view of a truck frame composed largely of castings.

Fig. 8 is a view half in side elevation and half in vertical section on the longitudinal center of the frame shown in Fig. 7.

Figure 1:
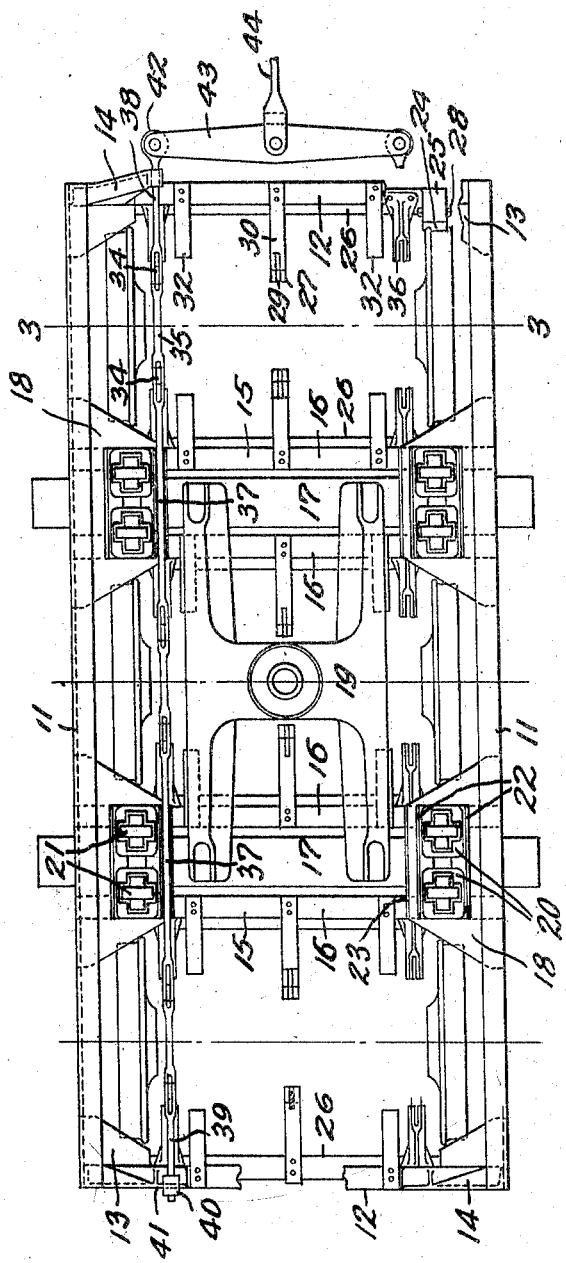
Figure 1 is a plan view of the truck with the brake levers and links omitted on one side.
Figure 2:
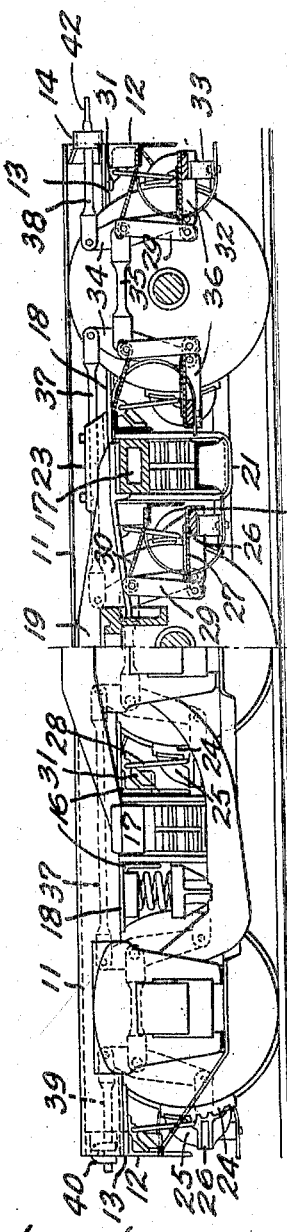
Fig. 2 is a view, half in elevation and half in vertical section on the longitudinal center line of the truck.
Figure 3:
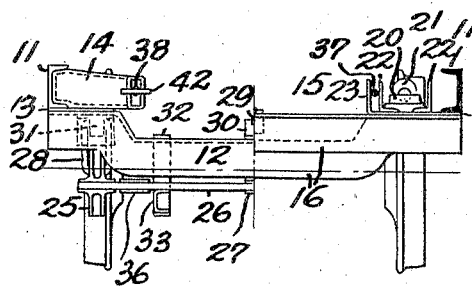
Fig. 3 is a view half in end elevation and half in vertical cross section on the line, 3—3, Fig. 1.
Figure 9:
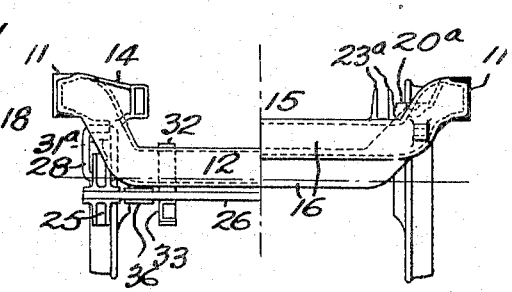
Fig. 9 is a view half in end elevation and half in cross section on the line 9—9, Fig. 7.
Figure 4:
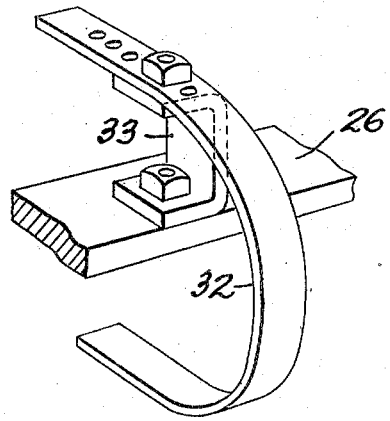
Fig. 4 is a perspective view of one of the release springs in inverted position.
Figure 6:
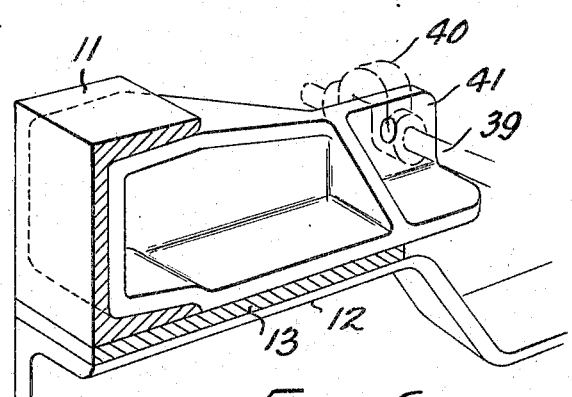
Fig. 6 is a view similar to Fig. 5, showing the brace at the opposite end of the truck.
Figure 5:
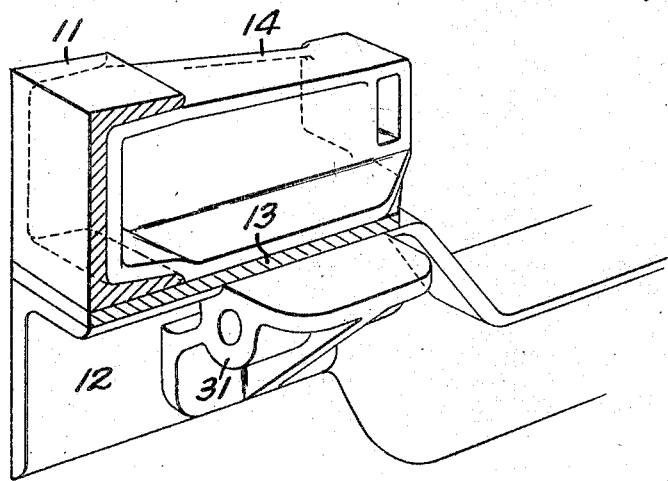
Fig. 5 is a perspective view of the brake rod guide and frame corner brace at one end of the truck.

Referring more particularly to the drawings, 11 designates the longitudinal side members or wheel pieces of a truck, which may be either rolled steel channels or castings of channel shape. As will be clearly seen, these wheel pieces are absolutely straight throughout their entire length, without offset for equalizers and accommodating M. C. B. standard pedestals. The wheel pieces are connected at the ends by transverse end sills 12, which are connected under the wheel pieces. These end sills are offset downwardly in their central portion, as clearly shown, and are preferably L-shaped in cross section. The end sills may be constructed of rolled steel angles forged to the necessary shape, or may be steel castings. In the former case, gusset plates 13 will be used to connect the end sills to the wheel pieces, and castings 14 will be provided where necessary for the brake gear, while in the latter case, the brake gear receiving portions and the equivalent of the gusset plate will be formed integral with the end sill proper. Intermediate the wheel positions, transoms 15 are provided connecting the wheel pieces, each of which is formed of a pair of parallel members 16 adapted to receive between them a side bolster 17. The members 16 are preferably L-shaped in cross section, as shown, and in the case of a truck built up of structural steel, these members will be angles, and will be connected to the wheel pieces by large gusset plates 18. As in the case of the end sills, the transoms are connected under the wheel pieces, or on top of the lower flange, or between the flanges, and the adjacent members 16/of the transoms are offset downwardly to give clearance for the arms of the center bolster or spider 19, which connects the side bolsters 17. When the truck frame is built up of structural shapes, castings 20 are secured to the plate 18 and form bearings for the spring suspension links 21. The plate 18 is stiffened by the interposition of angles 22 between it and the bearings 20. The inner edge 23 of the plate 18 may be turned up parallel with and a short distance from the inner angle 22, so as to form with the angle 22 a guide for the brake mechanism. When, however, the transom is made of a single casting, the members 16, 18 and 20 will be formed integral, and the stiffer material will preclude the necessity of the outer stiffening angles 22. The inner angles 22 and the plate edges 23 will be replaced by lugs on the casting.

The arrangement of springs, pedestals, journals and equalizing levers is that in every day use, and needs no description.

The arrangement of the brake gear forms what is known as a clasp brake, that is, a gear in which two shoes are applied to each wheel at points on opposite sides of the rotative center. The brake shoes, designated 24, are mounted in the usual manner in heads 25, which are secured to brake beams 26. The brake beams are each provided with a balance arm 27 extending at right angles therefrom. The brake beams together with the heads and shoes are supported at each end by suspension links 28, and by steadying links 29 extending from the extremities of the balance arms 27 to the free extremities of balance springs 30 fixed to the end sills and transoms. In this method of suspension, the links 28 take the load, while the arms 27 and the links 29 hold the brake beams against turning over substantially on their own axes. It will be seen that each brake beam has double suspension. According to this invention, the lengths of the links 28 and 29, their angular disposition to one another, and the location of pivotal points, have been so determined that the brake beam will travel substantially in a horizontal plane, when the brakes are applied or released. This feature is of considerable importance, as it enables the wear to be distributed equally over the entire surface of the brakeshoe throughout the life of the shoe. With ordinary suspensions, the brake beam swings in an arcuate path, so that when a new shoe is in place, the wear comes all on the upper end of the shoe. When the shoe is half worn, the wear is equally distributed, and when the shoe is further worn, the wear comes on the lower end. Further than this, the unequal distribution of wear and of pressure has a tendency to rotate the brake beam on its own axis, which tendency is resisted by and taken up in the brake beam suspension. This force is in reality nothing but a loss of braking force. With the horizontal moving brake beam, and uniform wear and pressure on the shoes throughout their life, there is no appreciable tendency for the brake beams to rotate around their axes, so that none of the available braking force is dissipated in this manner. It will be noted that the links 28 are uniform throughout the truck, also the links 29, balance arms 27 and balance springs 30. These balance springs 30 are slightly bent adjacent their fixed ends, so that the spring may be applied one side upon the end sills and offset transom members, and the other side upon the straight transom members, and bring the free ends of all springs into the same horizontal line. The links 28 are secured to the truck frame by engagement in bearings 31, which in the case of a truck frame built up of structural sections will be castings riveted to the end sills and transoms, and in the case of a truck frame made up of castings, the bearings 31 will be integral parts of the castings. Release springs 32 of C shape are provided adjacent each end of each brake beam. These springs are uniform throughout the truck, and are each connected at one end to an end sill or a transom, and at the opposite end to a brake beam. It will be noted that the outer transom members are higher above the brake beams than the inner transom members and end sills, and that in these positions the springs are connected directly between the transoms and brake beams, whereas in other places fillers 33 are used between the springs and brake beams. The use of these fillers enables the use of springs of uniform length and shape giving nearly uniform tension. As it is a recognized impossibility to temper all springs of a series to exactly the same degree, the lower end of each spring is provided with a series of apertures through any one of which it may be bolted to the filler or brake beam. By this means, the tension of the release springs may be regulated so as to be uniform throughout the truck. The resistance of the brakes on the truck either through grip on the wheels or through the release springs should be uniform for the most efficient working of the brake in any kind of a truck, but in a truck having clasp brakes, this is more important than ever.

The operating gear of the brakes is duplicated on each side of the truck. It consists of a series of levers 34 arranged in pairs behind the wheels. These levers are connected at eccentric points behind the wheels by links 35. The lower extremity or longer arm of each lever is connected to a draft arm 36 fixed to the brake beam close inside the wheel. The levers 34 of the wheels are connected up by links 37 secured to the upper extremities or shorter arms of adjacent levers. So far, this leaves the extreme end levers of the trucks disconnected. The lever which is nearest the end of the car is connected to a link 39 rigidly anchored to the end sill by a U-shaped nut 40, which embraces a lug 41 on the end sill. The shape of this nut precludes the possibility of it being turned and therefore the only way in which adjustment can be effected is by turning the link in the nut. To accomplish this, the link must be disconnected from its lever 34. This operation requires considerable time and the expenditure of a certain amount of force, so that this adjustment will not be attempted by unauthorized or incompetent persons. When, however, such adjustment is necessary, it may be carried out without great difficulty as the pin which requires removal is near the top and end of the truck and readily accessible without it being necessary to raise the car body off the truck. The links 37 pass between the guide members 22 and 23 previously referred to, and are thereby maintained in proper line, although considerable vertical movement is allowed. The bracket 14 of the link 38 is provided with a vertically disposed slot, through which the link passes. In order to insert the link, it must be disconnected from the lever 34, its eye 42 passed through the slot, the link then turned on its axis through 90° and connected to the lever 34. It will be readily seen that the eye 42 now prevents re-passage of the link through the slot, without its disconnection from the lever 34. This arrangement makes the truck a complete unit in itself, and prevents the loss of these links when the trucks are separated from the car. The links 38 of each truck are connected by an evener 43, which is in turn connected by a rod 44 with the brake cylinder. The duplicate sets of brake gear in the truck are thus connected up and the force equally distributed between the two. The operation of the gear is obvious, and it will be readily understood that the force applied through the links 38 is equally distributed among all the brake shoes, so that each wheel receives equal braking force.

Figure 10:
Fig. 10 is a cross sectional view illustrating another form of cross section which may be used for the cast members.

While angles are shown as the transverse members in the frame, when built of rolled steel sections, it will be understood that the invention is not limited to angles, as these members may be of any other suitable section, such as the channel sections shown in the cast members in Figs. 7 and 8, and the I section, shown in Fig. 10.

From the foregoing description, it will be readily understood in what manner the objects set forth in the beginning of the specification have been attained. The truck frame is extremely simple and easily constructed either of rolled structural steel or steel castings. Parts have been standardized so that the cost of construction and renewals is reduced. The arrangement of the parts is such that replacements and repairs are easy. The brake gear permits of every desired adjustment, and has in addition the great advantage that the brake beams travel in a horizontal plane and apply the shoes uniformly to the wheels. While the invention has been illustrated and described only as applied to six-wheel trucks, it will be obvious that it is equally applicable to four-wheel trucks.

Having thus described our invention, what we claim is:—

1. In truck construction, wheel pieces, bolster guides connected thereto, gusset plates arranged between the wheel pieces and bolster guides, upwardly turned at their inner edges, and bolster hanger supports cooperating with said inturned plate portions to form brake gear guides.

2. In truck construction, wheel pieces, transverse members connected therebetween, and stiffening members connected between the wheel pieces and transverse members at the corners of the truck, said stiffening members each having a projecting portion forming a brake gear guide.

3. In truck construction, a frame comprising a pair of wheel pieces, end sills and transoms connecting the wheel pieces, cast stiffening members connected between the wheel pieces and end sills, gusset plates connected between the wheel pieces and transoms having the inner edges thereof upturned, end sill and wheel piece connectors, and upturned portions of the transom gusset plates forming brake gear guides.

4. In truck construction, a frame comprising straight wheel pieces free from projections, end sills and transoms connecting the wheel pieces, a brake gear, supporting and guiding means therefor on the end sills and transoms, each of said end sills and transoms with the brake gear supporting and guiding means thereon being a single casting.

5. In truck construction, a truck frame, and brake gear tension member guides formed integral with the frame.

6. In truck construction, cast truck frame members, and brake gear tension member guides formed integral with the frame members.

7. In truck construction, a truck frame, and integral extensions of the members thereof forming brake gear tension member guides.

8. In truck construction, a truck frame, and integral extensions from said frame arranged in pairs and adapted to embrace and hold against lateral movement the tension members of a brake gear.

9. In truck construction, a truck frame, and separate members thereon arranged in pairs and adapted to embrace and hold against lateral movement the tension members of a brake gear.

10. In truck construction, a truck frame, and brake gear tension member guides thereon formed to hold brake gear members against escape while operatively connected in the brake gear.

In witness whereof, we have hereunto set our hands.

JAMES M. COLEMAN.
KARL F. NYSTROM.